United States Patent
Johansen

(10) Patent No.: US 10,768,096 B2
(45) Date of Patent: Sep. 8, 2020

(54) NOISE CANCELING DETECTOR

(71) Applicant: SINTEF TTO AS, Trondheim (NO)

(72) Inventor: Ib-Rune Johansen, Oslo (NO)

(73) Assignee: SINTEF TTO AS, Trondheim (NO)

( * ) Notice: Subject to any disclaimer, the term of this patent is extended or adjusted under 35 U.S.C. 154(b) by 173 days.

(21) Appl. No.: 15/749,655

(22) PCT Filed: Sep. 26, 2016

(86) PCT No.: PCT/EP2016/072865
§ 371 (c)(1),
(2) Date: Feb. 1, 2018

(87) PCT Pub. No.: WO2017/055219
PCT Pub. Date: Apr. 6, 2017

(65) Prior Publication Data
US 2018/0224370 A1 Aug. 9, 2018

(30) Foreign Application Priority Data
Sep. 29, 2015 (NO) .................................... 20151276

(51) Int. Cl.
*G01N 21/17* (2006.01)
*G01L 9/00* (2006.01)
*G01N 21/31* (2006.01)

(52) U.S. Cl.
CPC ........ *G01N 21/1702* (2013.01); *G01L 9/0079* (2013.01); *G01N 2021/1704* (2013.01);
(Continued)

(58) Field of Classification Search
CPC ............... G01N 21/00; G01N 21/1702; G01N 2021/1704; G01N 2021/1708;
(Continued)

(56) References Cited

U.S. PATENT DOCUMENTS 4,818,882 A    4/1989  Nexo et al.
7,245,380 B2   7/2007  Kosterev
(Continued)

FOREIGN PATENT DOCUMENTS

JP     H01-277000 A      11/1989
WO     WO-2003046498 A1   6/2003
(Continued)

OTHER PUBLICATIONS

Breguet, J., et al., "Photoacoustic Detection of Trace Gases With an Optical Microphone," Sensors and Actuators A: Physical, Elsevier BV, NL, vol. 48, No. 1, May 1, 1995, pp. 29-35.
(Continued)

*Primary Examiner* — Lisa M Caputo
*Assistant Examiner* — Nigel H Plumb
(74) *Attorney, Agent, or Firm* — Schackelford, Bowen, McKinley & Norton, LLP

(57) ABSTRACT

The present invention relates to an optical gas detector for detecting a gas absorbing light at a known wavelength, wherein the gas detector comprises two essentially identical, parallel membranes defining a volume between them containing the gas to be investigated, and a modulated first light source emitting light at said known wavelength into said volume at a chosen frequency, the detector is adapted to detect relative movements between said membranes and said movements having a frequency corresponding to the rate or a multiple of the rate of said pulsed light source, and wherein the said volume has at least one opening allowing the gas to unrestricted flow or diffuse into said volume.

13 Claims, 3 Drawing Sheets

(52) U.S. Cl.
CPC ........... *G01N 2021/1708* (2013.01); *G01N 2021/3129* (2013.01)

(58) Field of Classification Search
CPC ........... G01N 2021/3129; G01N 21/81; G01N 30/00; G01N 30/8624; G01N 2291/02872; G01N 7/00; G01L 9/0079; G01H 9/00
See application file for complete search history.

(56) References Cited

U.S. PATENT DOCUMENTS

| | | |
|---|---|---|
| 2006/0123884 A1 | 6/2006 | Selker et al. |
| 2009/0038375 A1 | 2/2009 | Breuer et al. |
| 2010/0139368 A1 | 6/2010 | Kotovsky et al. |
| 2013/0160557 A1 | 6/2013 | Nakajima et al. |
| 2014/0245816 A1 | 9/2014 | Disch |

FOREIGN PATENT DOCUMENTS

| | | |
|---|---|---|
| WO | WO-2004029594 A1 | 4/2004 |
| WO | WO-2006110041 A1 | 10/2006 |
| WO | WO-2006110042 A1 | 10/2006 |
| WO | WO-2008026146 A1 | 3/2008 |
| WO | WO-2011033028 A1 | 3/2011 |
| WO | WO-2013012019 A1 | 1/2013 |
| WO | WO-2014202753 A1 | 12/2014 |

OTHER PUBLICATIONS

Meacher, David, "International Search Report," prepared for PCT/EP2016/072865, dated Feb. 8, 2017, six pages.
Cao, et al., "Miniature Fiber-Tip Photoacoustic Spectrometer for Trace Gas Detection," Optics Letters, Feb. 15, 2013, vol. 38, No. 4, pp. 434-436.
Damerud, Jens Jørgen, 4th edition, 2013, p. 100.
Wikipedia. "Microphone." <https://en.wikipedia.org/wiki/Microphone>. Sep. 20, 2015.

NOISE CANCELING DETECTOR

The present invention relates to an optical gas detector for detecting a gas absorbing light at a known wavelength.

Absorption type gas sensors are well known where light is transmitted through a gas mixture toward a detector, where a certain gas absorbs light at certain characteristic wavelengths and if both the transmitted spectrum and the detected spectrum is known it is possible to see the concentration of the gas. Measuring the spectrum of the transmitted light is, however, a complicated process, and also difficult to incorporate in compact low cost equipment such as devices for measuring alcohol content.

Some alternative solutions have been developed where the absorption of certain wavelengths in a gas may be utilized in that the absorption results in a rise of temperature in the gas, or in pressure fluctuations. The photoacoustic gas detectors invented by Brüel and Kjær (U.S. Pat. No. 4,818,882) have been demonstrated to detect very low levels of gas. The hart of the photoacoustic gas detectors are the very good condenser microphones made by Brüel and Kjær. The low frequency sensitivity of a condenser microphone is limited by the required pre stress of the membranes. This pre stress is needed to avoid that the capacitive forces pulls the membrane into the back plate. The present invention will improve on this by i.e. using optical readout, allowing the membrane to be made much softer (less stress). Further, the Brüel and Kjær condenser microphone has an omnidirectional response. An omnidirectional (or nondirectional) microphone's response is generally considered to be a perfect sphere in three dimensions (ref https://en.wikipedia.org/wiki/Microphone). This means that the condenser microphone picks up noise from all directions. The present invention improves on this in several ways, as explained later. Further, the photoacoustic gas detectors invented by Brüel and Kjær needs to have the gas inside a closed volume to work properly. This means that the gas sensor needs pumps to transport the gas into the closed volume, and valves to seal of the volume. The present invention does not need pumps or valves.

Another photoacoustic detection method is described in US2005/117155 (U.S. Pat. No. 7,245,380), where pulsed light source is applied. One of the most attractive features with this invention is that it does not requires the use of pumps or valves as the standard photoacoustic approach. The pulsed light is absorbed by a fluid and give rise to acoustic waves in a sample fluid that may be detected by a resonating fork shaped crystal from which the resulting signal may be read. The absorbed energy is accumulated in the crystal fork, and the crystal fork act as a mechanical filter at the resonance frequency. The fork is preferably made from quartz which may be suitable for use in a liquid, but will have limited coupling efficiency in a gas. The pulse rate is bound by the resonance frequency of the fork, and this requires very good control on the excitation frequency and methods for compensating changes in resonance frequency due to temperature, change of the mass of the fork (i.e dust particles) or other external influences.

Thus it is an object of the present invention to provide a compact and inexpensive photo acoustic gas sensor having low sensitivity to external vibrations while having high sensitivity gas detection. This is obtained with an optical gas detector characterized as stated in the accompanying claims.

According to a preferred embodiment of the invention the gas detector is thus based on monitoring the distance between two parallel membranes defining a volume between them. Gas will be detected as pressure or velocity wave/pulse propagating outward from the volume between the membranes, thus pushing them apart in opposite directions. Vibrations and external acoustic noise from the environment will move the membranes in the same direction thus maintaining the distance between them and thus will not be detected by the detector.

A condenser microphone has an omnidirectional response due to the closed back volume, and will pick up noise from all three directions. A microphone without a back volume, like a basic ribbon microphone detect sound in a bi-directional (also called figure-eight) pattern because the ribbon is open on both sides. So, a single membrane is not sensitive to sound coming from the sides, and have the main sensitivity in the direction perpendicular to the membrane. In the present invention, two single membranes are used, and they are still insensitive to sound or vibrations coming from the sides. External sound or vibration perpendicular to the membranes will move both membranes, and since we are measuring the relative movement between the two membranes, the contribution from the external source will be significantly reduced, and in principle totally removed, if the wavelength from the external source is long compared to the distance between the two membranes. The signal generated by the absorption of the gas between the membranes will push the membranes apart, and will not be cancelled.

Several different means may be provided for measuring the movement, for example using symmetric membranes having piezoelectric rings as shown in WO2011/033028 being connected electrically so as to remove signals if the membranes move in the same direction. Similar designs can be made using piezo resistive or capacitive sensor approaches.

Preferably the distance between the membranes is measured optically using interferometry, i.e. an adoption of the measuring system discussed in WO 2003/046498. According to the preferred embodiment the membranes thus constitute mirrors in a Fabry-Perot interferometer changing the resonance as a function of the distance between the membranes.

The invention will be discussed below with reference to the accompanying drawings, illustrating the invention by way of examples.

Figure 4A:
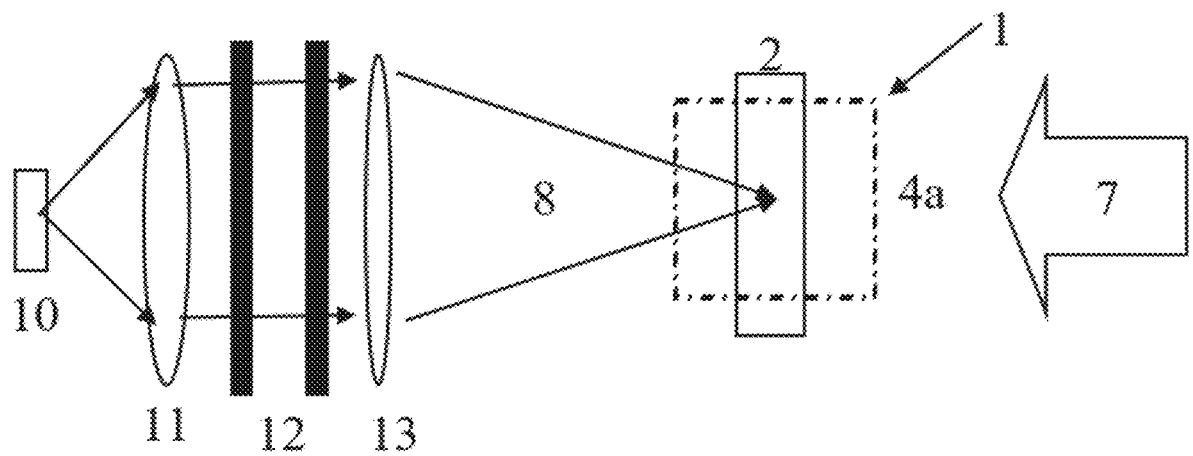

FIG. 4*a,b* illustrates a preferred embodiment of the invention providing an optical measurement of the distance between the membranes.

Figure 1:
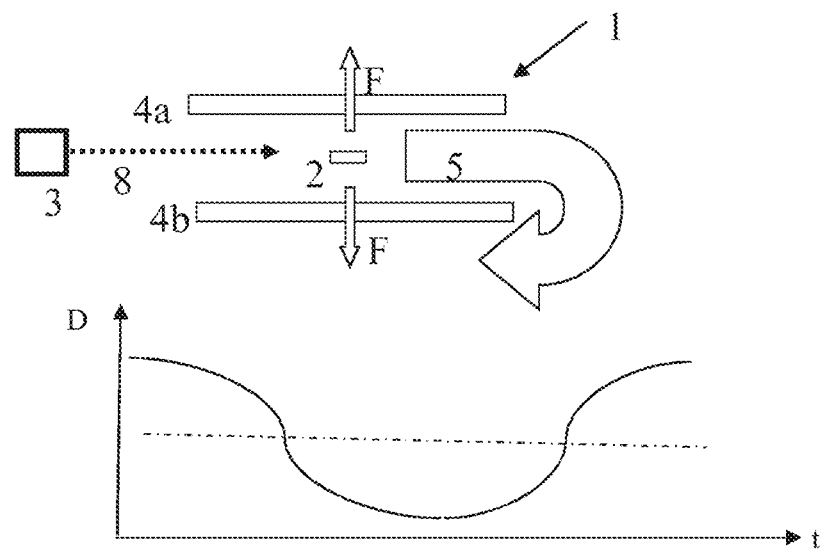
FIG. 1 illustrates a gas sample positioned between two membranes

As illustrated in FIG. 1 the gas detector 1 essentially relates to gas volume 2 illuminated by a pulsed light beam 8 from a source 3. As the light is absorbed the gas volume expands and push the two membranes 4*a*,4*b* apart with a force F. As is indicated in the drawing the distance D between the membranes 4*a*,4*b* will vary with time t and the amplitude of the variation in D will relate to the concentration of the target gas in the sample. The gas volume 2 is not positioned in a closed container but is essentially free to move or diffuse into the measuring volume, thus making pumps or other means for obtaining flow unnecessary, although this will depend on the intended use and operation of the sensor. The gas volume may simply be defined by the position of the membranes, without any other walls or contained parts.

A very simplified model of sound coming from the gas excitation is an acoustic point source, generating a spherical wave. The sound pressure from a spherical wave is reduced proportional to the propagation distance r (Ref "Elektroakustikk", Jens Jørgen Dammerud, 4th edition, 2013, page 100), and the sound intensity is reduced proportional to $r^2$. This means that if the distance from the acoustic point source to the inside of the membrane is 1 mm, and the distance from the point source to the outside of the membrane is 10 mm, the sound pressure is 10 times lower on the outside, and the movement of the membrane is dominated by the direct path from the inside.

As is indicated in FIG. 1 the acoustic signal generated in the gas sample may flow 5 around the membrane 4a,4b and thus the pulse frequency and the size of the membranes may be chosen so as to avoid negative feedback, while at the same time keeping the volume opens so as to let the gas flow freely though the volume. By choosing the dimensions of the membranes correctly the pressure at the outside may have the opposite phase of the pressure between the membranes 4a,4b and thus increase the signal strength. By generating acoustic pulses at 20 kHz the wavelength of the sound is 17 mm. If propagation path from the from the volume to the back side of the membranes is 17 mm the back and front sides are in phase and the movements of the membrane is reduced or even cancelled. However, if the propagation path is 17/2=8.5 mm the sound on the back of the membrane is anti-phased which may increase the amplitude of the membrane movements and thus improve the signal of the detector. Thus the optimal dimensions of the membrane and gas volume may vary depending of the sound velocity in the gas. However a measurement will be obtained as long as the movements are not completely cancelled.

Figure 2:
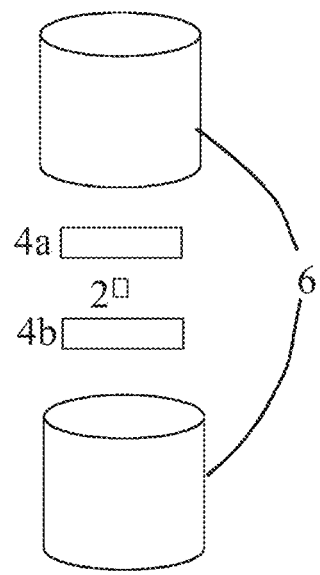
FIG. 2 illustrates an embodiment of the invention where the gas sensor is provided with a resonator.

In FIG. 2 the detector comprises a acoustic resonator 6 enclosing the first and second membranes 4a,4b and which, when matched with the pulse rate of the light source, may amplify the vibrations and thus the signal.

Figure 3:
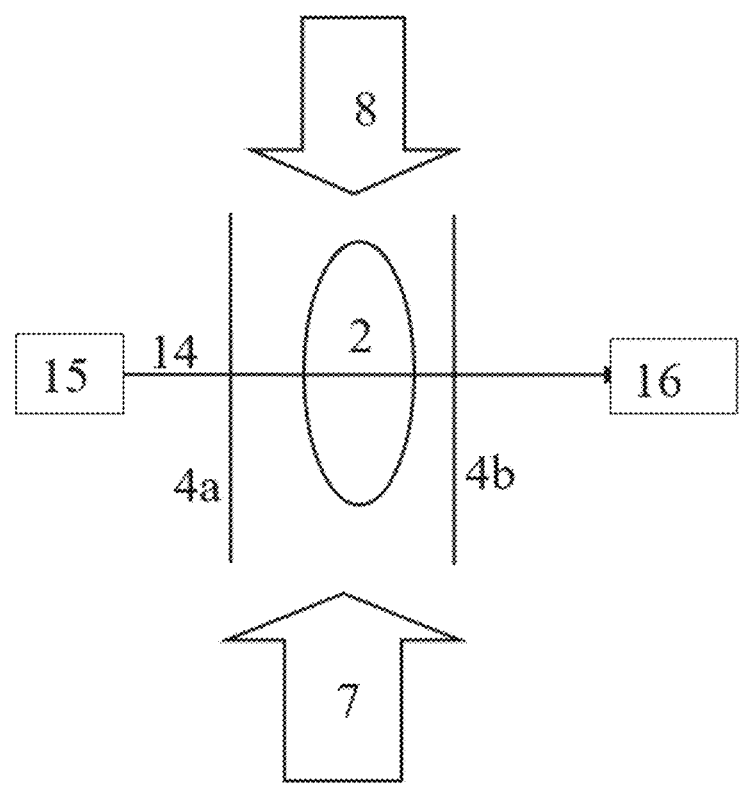
FIG. 3 illustrates the sensor with optical readout.

In FIG. 3 a schematic illustration is shown where gas 7 is introduced into the space between the membranes 4a,4b defining the gas volume 2 and light 8 from an infrared broad band source illuminates the gas volume 2 which absorbs light at characteristic wavelengths. The distance between the membranes 4a,4b is measured using interferometric means, i.e. an adaption of the method described in WO 2003/046498. In order to obtain this the membranes have an at least partially reflective surface so that the cavity between the membranes constitutes a Fabry-Perot with resonance frequency depending on the distance between the membranes. One (or more) narrowband light source 15, i.e. a diode laser, is used to transmit monitoring light 14 through the membranes 4a and 4b, and onto one or several detectors 16. An alternative configuration is to read out the signal reflecting from the membranes. The light source 15 and detector 16, including any optical means to focus or collimate light, are typically placed more than 0.1 mm, preferably several mm, away from the membranes to avoid any form of squeeze-film effects generating noise. To obtain a sensor as sensitive as possible, the stress in the membranes should be as low as possible, typically between 5 and 50 MPa.

Figure 4B:
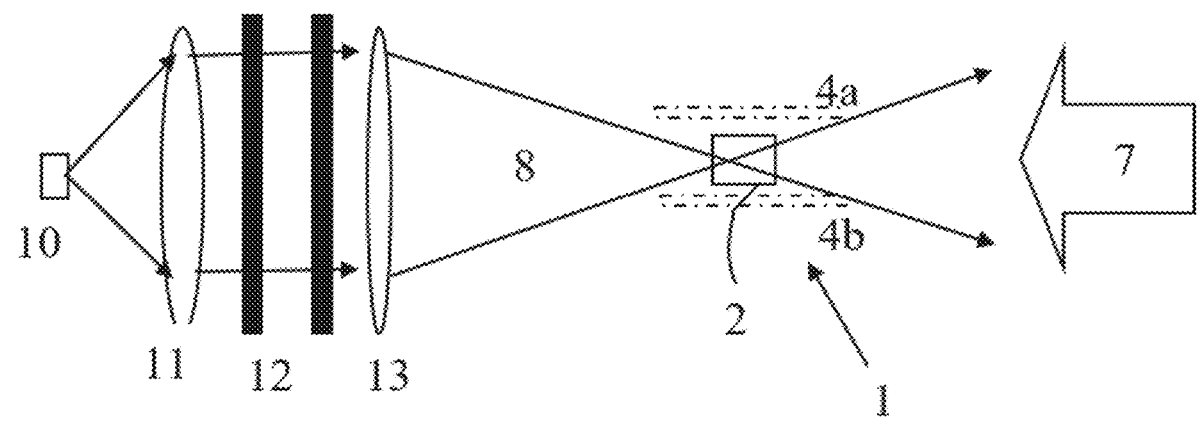

FIGS. 4a and 4b illustrates the light source illuminating a gas flow 7 between two membranes 4a,4b. FIG. 4a illustrates a gas detector according to the invention from one side while FIG. 4b illustrates the gas detector as seen from above. The source may be a broad band IR source 10 emitting light at a fairly wide range of wavelengths. The light is collimated by a lens 11 and transmitted through a Fabry Perot interferometer 12 in order to select at least one of the characteristic wavelengths of the gas to be detected. A second lens 13 is used to focus the light at the gas sample 2. This light source unit may be provided in different embodiments depending on the operating wavelengths and gas to be detected and the lenses may be both refractive and diffractive. For CO measurements filters as described in WO2006/110041 and WO2006/110042 may be used at the source. For other gases, the filters described in WO2011/033028 may be used at the source.

The focal length of the second lens 13 focusing the light at the gas volume may be chosen so as to define a narrow cone, at least in the direction between the membranes, so that the membranes may be as close to each other as possible without blocking the light. By focusing the light 8 the measured volume 2 is also limited in the focal area, resembling an acoustic point source as mentioned above. As can be seen in FIG. 4b the focused light beam does not propagate through any window or other materials close to the gas sample volume 2, which is advantageous as no additional absorption occurs which might affect the conditions in the sample, but most important, the use of no window avoids the generation of acoustic signals that typically is the main limitations in photoacoustic spectrometry. The removal of the windows allows zero signal when no gas is present, while the use of a window typically give a baseline signal that need to be subtracted, and this baseline signal will vary over time, and thereby be the limitation of the sensors accuracy.

The modulation of the light source may be performed by switching it on and off, but this may affect the emitted spectrum. Another alternative is blocking the beam at the chosen rate, e.g. using a spinning wheel or LCD. According to the preferred embodiment the Fabry Perot may be used scanning back and forth over the characteristic wavelength so that the absorption occurs at a rate depending on when the light has the right wavelength. Typically, if the source is wavelength modulated with a frequency f, the signal may be demodulated at 1f, 2f, or 3f, and in some cases higher harmonics are used for demodulation.

In order to avoid acoustic waves propagating from the investigated gas volume to the back of the membrane the modulation frequency must be relatively high. If the Fabry Perot interferometer is scanned at a rate of e.g. 10 kHz the acoustic frequency will be 20 kHz, which means an acoustic wavelength of 17 mm. The example illustrated in FIGS. 4a,4b is based on a 1 mm×0.2 mm source transmitting light through a F-P filter with 3 mm diameter and further between the membranes, and use the lens 13 for focusing the light from the source between the membranes. The distance between the membranes may typically be between 0.3 mm and 5 mm, depending on size of the source. The size of the membranes may typically be between 1 and 25 mm, and the thickness of the membrane may typically be between 10 and 1000 nm. Good results have been obtained with a membrane diameter of 5 mm and a silicon nitride membrane with a thickness of 100 nm.

The membrane thickness of only 100 nm is a great advantage towards any system using a condenser microphone or an electret microphone, as these typically have a membrane thickness of 3000 nm or more. This means that the present invention will be 30 times less sensitive towards external vibration only due to the weight of the membrane. In addition comes the advantage of measuring the relative distance between the two membranes.

The response curve made by the Fabry-Perot will depend of the reflection of the membranes, and low reflection will give a cosinus like response. Anyway, it is important to monitor the movement of the membrane on a position on the response curve where the sensitivity is high. We can call this position the sensors working point. The working point can be obtained by tuning the distance between the two membranes. This can be done by using an electrostatic actuator, a piezoelectric actuator or a thermal actuator. Alternatively, the wavelength of the source used to monitor the relative displacement between the membranes may be tuned to match the working point.

The third way to obtain a reasonable working point is by using a number of recesses in the membrane as described in WO2014/202753. The interferometric signal generated by a Fabry-Perot will typically repeat itself for each half wavelength increase in distance between the membranes. For membranes with low reflection, the Fabry-Perot signal can be approximated by a cosine waveform. If we use only the interference between two membranes, the working point may be at the top or at the bottom of the cosine curve, and the sensitivity will be very low. A good way to improve this, is to introduce a second area where the distance between the membranes are 90° out of phase (or 90°+/−n×180°, n=0, 1, 2, 3 . . . ). When the distance between the membranes changes, we will now have both a sine and a cosine curve, and we are able to calculate the correct change of distance. The second area can be made with a recess in the membrane. From a practical point of view, it may sometimes be difficult to calculate the correct distance with only a phase shift of 90°, due to ambiguity around change in direction of the movement. If we use one more recess and generate three areas with 0°, 120° and 240° phase offset (or n×120°+m× 360°, n=0, 1, 2. m=0, 1, 2, 3, . . . ) of the interference signal, the correct amplitude of the signal can be calculated with a higher level of confidence. In some cases even more than two recesses may be advantageous. Details are discussed in WO2014/202753, which is incorporated here by reference.

The present inventions is specially well suited for miniaturized gas sensor systems. A sensor less than a few $cm^3$ can easily be made, and the combination of a tunable source and the noise canceling photoacoustic detection method make this sensor well suited for a number of different applications, including sensors for alco-lock, evidential alcohol sensors, refrigerator gases, anesthetic gases e.t.c.

Thus the preferred embodiment of the present invention involves an optical gas detector for detecting a gas absorbing light at a least one known wavelength. The gas detector comprises two essentially identical, parallel membranes defining a volume between them containing the gas to be investigated, and a modulated first light source emitting light at said known wavelength into said volume at a chosen frequency.

The detector is adapted to detect the relevant movement between said membranes at the frequency or a multiple of the frequency of said pulsed light source, so as to detect the movements caused by the absorption of the pulsed light in the gas volume 2. This way any external noise causing the membranes to movement in the same direction will not disturb the measurements.

In addition the gas is allowed to flow or diffuse unrestricted into and out of the detector so that external influences such as temperature variations will not give rise to variations in the pressure in the volume and thus relative movements between the membranes.

The movements may be detected by monitoring the distance between said two membranes, for example by transmitting monitoring light in a direction essentially perpendicular to said membrane. If said membranes being partly reflective and at least one of said membranes being partly transparent to said transmitted light, a Fabry-Perot interferometer is obtained and by monitoring the transmitted or reflected intensity from said Fabry-Perot interferometer, variations in the distance D may be measured.

Also a number of recesses may be incorporated into the membrane, the depth of the recesses are optimized to give a relevant phase change. By monitoring the signals generated by the recesses, the amplitude of the signal may be corrected.

Alternatively the distance between the membranes are tuned by feedback from the monitoring system to obtain a reasonable working point, or the wavelength of the monitoring light are tuned by feedback from the monitoring system to obtain a reasonable working point.

According to another embodiment of the invention the pulsed light is transmitted into the gas volume through an opening in or between the membranes, such as the same opening used by the gas flow. Standard photoacoustic sensors have windows that, regardless of the chosen material, will contribute to the acoustic signal. Thus, according to a preferred embodiment of the invention, no optical windows are used to enclose the gas inside the said volume, avoiding any signals generated by absorption on the windows.

The light source may include a tunable Fabry-Perot filter used to select wavelength and/or perform modulation of the wavelength, or a tunable laser may be used to select wavelength and/or perform modulation of the wavelength.

As an alternative to the optical measurements the relative movements or distance between the membranes may be is monitored using piezoresistive, piezoelectric or capacitive means.

The pulse rate of the light pulses and size of the membranes are chosen so that the wavelength of the generated vibration, depending on the sound velocity of the gas and the pulse rate of the light beam, is less than half the diameter of the membranes, so as to avoid cancelling of the movement of the membranes. Also the total size of the gas volume is preferably less than 4 $cm^3$ so as to allow short response.

The invention claimed is:

1. A noise cancelling optical gas detector for detecting a gas absorbing light at a known wavelength, the optical gas detector comprising:
   two identical, parallel membranes defining a volume between them containing the gas to be investigated;
   a modulated light source emitting light at the known wavelength into the volume at a chosen modulation frequency;
   wherein the optical gas detector is adapted to detect movements between the membranes caused by the light absorption in the gas resulting in pressure fluctuations in the gas volume resulting in movements of said two membranes thus having identical opposite directions and having a frequency corresponding to the rate or a multiple of the rate of the modulated light source;
   wherein the gas volume allows the gas to flow or diffuse unrestricted into the volume; and
   wherein the movement detections are provided by using optical measurements adapted to monitor the distance between the two membranes.

2. The optical gas detector according to claim 1, wherein the movement detections are provided by using optical interferometry.

3. The optical gas detector according to claim 2, wherein the distance is monitored optically by transmitting monitoring light in a direction perpendicular to the membranes, the membranes being partly reflective and at least one of the membranes being partly transparent to the transmitted light, thus providing a Fabry-Perot interferometer and by monitoring the transmitted or reflected intensity from the Fabry-Perot interferometer.

4. The optical gas detector according to claim 3, wherein a number of recesses are incorporating into at least one membrane, the depth of the recesses are optimized to give a chosen phase change in the transmitted and reflected light, so as to provide a correction to the monitored change in the distance between the membranes.

5. The optical gas detector according to claim 3, wherein the monitored distance between the membranes is tuned by feedback from the monitoring means to obtain a working point.

6. The optical gas detector according to claim 3, wherein the monitoring light has a wavelength are tuned by feedback from the monitor distance measurement to obtain a working point.

7. The optical gas detector according to claim 1, wherein no optical windows are used to enclose the gas inside the volume, avoiding any signals generated by absorption on the windows.

8. The optical gas detector according to claim 1, wherein a tunable Fabry-Perot filter is used to select wavelength and/or perform modulation of the wavelength.

9. The optical gas detector according to claim 1, wherein a tunable laser is used to at least one of select wavelength and perform modulation of the wavelength.

10. The optical gas detector according to claim 1, wherein the modulation rate and size of the membranes are chosen so that the wavelength of the generated vibration in the gas, depending on the sound velocity of the gas, is less than half the diameter of the membranes.

11. The optical gas detector according to claim 1, wherein the total size of the volume is less than 4 cm$^3$.

12. An optical gas detector for detecting a gas absorbing light at a known wavelength, the optical gas detector comprising:
   two identical, parallel membranes defining a volume between them containing the gas to be investigated;
   a modulated light source emitting light at the known wavelength into the volume at a chosen modulation frequency;
   wherein the optical gas detector is adapted to detect movements between the membranes caused by the light absorption in the gas resulting in pressure fluctuations in the gas within the volume resulting in membrane and the movements of said two membranes thus having opposite directions and having a frequency corresponding to the rate or a multiple of the rate of the modulated light source;
   wherein the gas volume being allowed to unrestricted flow or diffuse into the volume; and
   wherein the movement detections are provided by using optical measurements adapted to monitor the distance between the two membranes
   wherein the movement detections provided by using optical interferometry
   wherein the distance is monitored optically by transmitting monitoring light in a direction perpendicular to the membranes, the membranes being partly reflective and at least one of the membranes being partly transparent to the transmitted light, thus providing a Fabry-Perot interferometer and by monitoring the transmitted or reflected intensity from the Fabry-Perot interferometer, and
   wherein a number of recesses are incorporating into at least one membrane, the depth of the recesses are optimized to give a chosen phase change in the transmitted and reflected light, so as to provide a correction to the monitored change in the distance between the membranes.

13. An optical gas detector for detecting a gas absorbing light at a known wavelength, the optical gas detector comprising:
   two identical, parallel membranes defining a volume between them containing the gas to be investigated;
   a modulated light source emitting light at the known wavelength into the volume at a chosen modulation frequency;
   wherein the optical gas detector is adapted to detect movements between the membranes caused by the light absorption in the gas resulting in pressure fluctuations in the gas within the volume resulting in membrane and the movements of said two membranes thus having opposite directions and having a frequency corresponding to the rate or a multiple of the rate of the modulated light source;;
   wherein the gas volume being allowed to unrestricted flow or diffuse into the volume;
   wherein the movement detections are provided by using optical measurements adapted to monitor the distance between the two membranes, and
   wherein the modulation rate and size of the membranes are chosen so that the wavelength of the generated vibration in the gas, depending on the sound velocity of the gas, is less than half the diameter of the membranes.

* * * * *